United States Patent [19]

Cassidy

[11] Patent Number: 5,516,245
[45] Date of Patent: May 14, 1996

[54] LOAD ANCHOR FOR CARGO BEAMS

[76] Inventor: Patrick S. Cassidy, 8951 Columbiana-Canfield Rd., Canfield, Ohio 44406

[21] Appl. No.: 367,995

[22] Filed: Jan. 3, 1995

[51] Int. Cl.⁶ .............................. B60P 7/06; B61D 45/00
[52] U.S. Cl. ........................ 410/101; 410/97; 410/102; 403/261
[58] Field of Search .................................. 410/101, 102, 410/120, 121, 104, 105, 97, 116, 144, 145, 150, 96; 24/265 CD, 686; 403/247, 256, 261, 4; 211/191–193, 105.1, 105.3, 103; 248/235, 243, 228

[56] References Cited

U.S. PATENT DOCUMENTS

| | | |
|---|---|---|
| 2,638,063 | 5/1953 | Clark . |
| 2,970,358 | 2/1961 | Elsner .................................... 410/116 |
| 3,051,099 | 8/1962 | Robertson ............................. 410/102 |
| 3,399,635 | 9/1968 | Heard . |
| 3,467,418 | 9/1969 | Redditt ................................ 248/228 X |
| 4,083,312 | 4/1978 | Holman, Jr. ............................ 410/97 |
| 4,236,854 | 12/1980 | Rogers . |
| 4,261,470 | 4/1981 | Dolan .................................... 211/191 |
| 4,464,089 | 8/1984 | Allen . |
| 4,770,579 | 9/1988 | Aksamit ................................ 410/150 |
| 4,772,165 | 9/1988 | Bartkus ............................ 410/145 X |
| 4,915,556 | 4/1990 | Unger ............................... 410/116 X |
| 4,992,015 | 2/1991 | Florence ........................... 410/101 X |
| 5,320,464 | 6/1994 | Long et al. ............................ 410/144 |

FOREIGN PATENT DOCUMENTS 3900112  7/1990  Germany .................................. 410/96

*Primary Examiner*—William E. Terrell
*Assistant Examiner*—Stephen Gordon
*Attorney, Agent, or Firm*—Harpman & Harpman

[57] ABSTRACT

A load anchor for cargo beams used in commercial cargo trailers having E-track cargo securing slots within to which cargo straps and beams are secured. The load anchor is of a sleeve configuration movable along the length of the cargo beams. The load anchor has multiple clip engagement openings thereabout engageable by locking clips on the ends of the respective cargo straps.

5 Claims, 2 Drawing Sheets

LOAD ANCHOR FOR CARGO BEAMS

BACKGROUND OF THE INVENTION

1. Technical Field

This invention relates to cargo anchoring devices of the type that are used to secure cargo within a commercial moving trailer. The anchoring devices are used on cargo beams secured between E-tracks with cargo straps and clips engageable therein to stabilize and secure the cargo within the trailer.

2. Description of Prior Art

Prior art devices of this type have relied on different sleeve and securing fixture configurations to provide points of attachment for cargo straps that are used to position and secure the load within the trailer. E-tracks are positioned within the opposing trailer sidewalls with telescopically extensible tubular cargo beams locked transversely within the trailer, see for example U.S. Pat. Nos. 4,464,089, 4,236,854, 3,399,635 and 2,638,063.

In U.S. Pat. No. 4,464,089 a load lashing tubular anchor for shoring beams is disclosed wherein an open ended tubular anchor member is arranged to be slideably positioned over a cargo beam. The tubular anchor member has two offset areas for the receiving cargo straps on its top and respective sidewall and an oppositely disposed locking threaded fastener to lock the tubular anchor member on the cargo beam. Cargo straps are positioned between the tubular anchor and the sleeve in the area defined therebetween.

In U.S. Pat. No. 4,236,854 a fortable cargo brace is disclosed which relates to a frame configuration which is adjustably positioned independently within the confines of a trailer. The adjustable frame has pairs of oppositely disposed adjustable arms intersecting one another with adjustable angularly disposed offset feet portions extending therefrom.

In U.S. Pat. No. 3,399,635 a freight bracing device is disclosed in which contoured track configurations are positioned longitudinally within the interior walls of a moving trailer in spaced vertical relation to one another. Special clips are then slideably positioned on these tracks and can lock into position with cargo straps extending between respective oppositely disposed clips securing the cargo against the strap and the remaining cargo or the end walls of the trailer.

Finally, in U.S. Pat. No. 2,638,063 a combination seam and shoring clamp is disclosed in which a clamp configuration is slideably positioned and then clamped onto a elongated flange extending from the sides of a cargo container trailer. The clamp uses a threaded nut and bolt assembly to clamp onto the angle and has a provision for accepting a loop of a cargo strap.

SUMMARY OF THE INVENTION

An adjustable load anchor for use with cargo beams used in commercial moving trailers wherein the cargo beams are used to separate and secure loads with the use of accompanying straps and clip assemblies. The load anchor of the invention provides a number of oppositely disposed attachment points adjustably positioned on the cargo beam for engagement with the strap and clip assemblies. The load anchor can be positioned anywhere along the cargo beam and will also provide attachment points for additional cargo beams to be interconnected at right angles to other cargo beams.

DESCRIPTION OF THE PREFERRED EMBODIMENT

Figure 1:
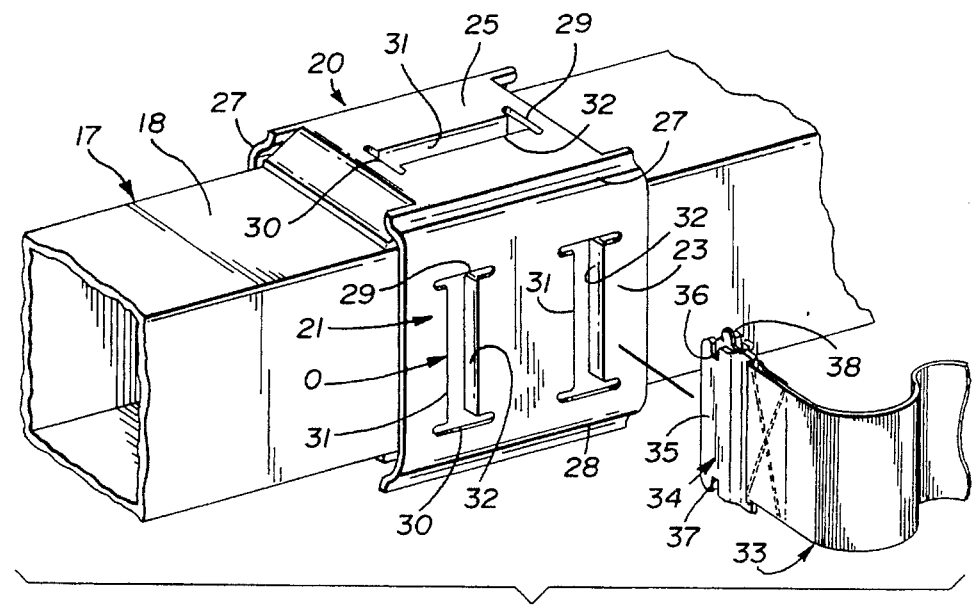
FIG. 1 is an enlarged partial perspective view of the present invention in use in a transportation vehicle with associated tie down strap and clip assemblies.
Figure 7:
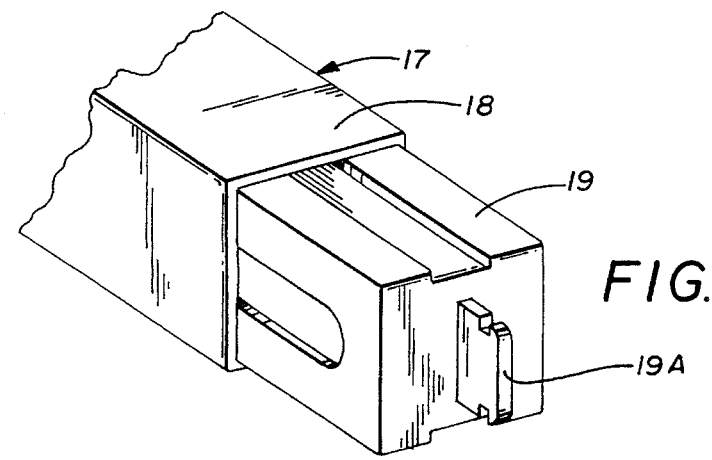
FIG. 7 is an enlarged partial perspective view of a cargo beam attachment point.
Figure 4:
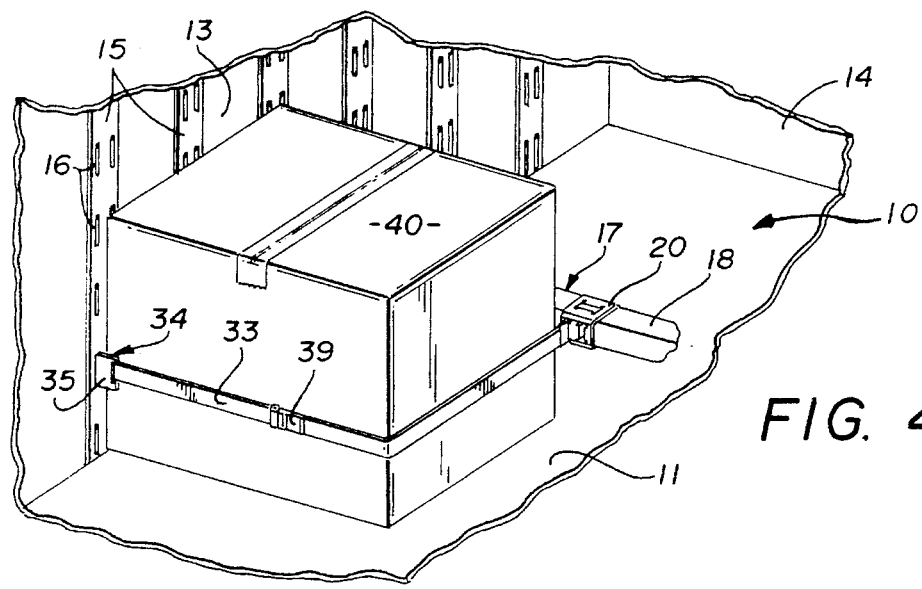
FIG. 4 is a fragmentary perspective view of the inner portion of a cargo area of a transport vehicle illustrating one application of the present invention therein.
Figure 5:
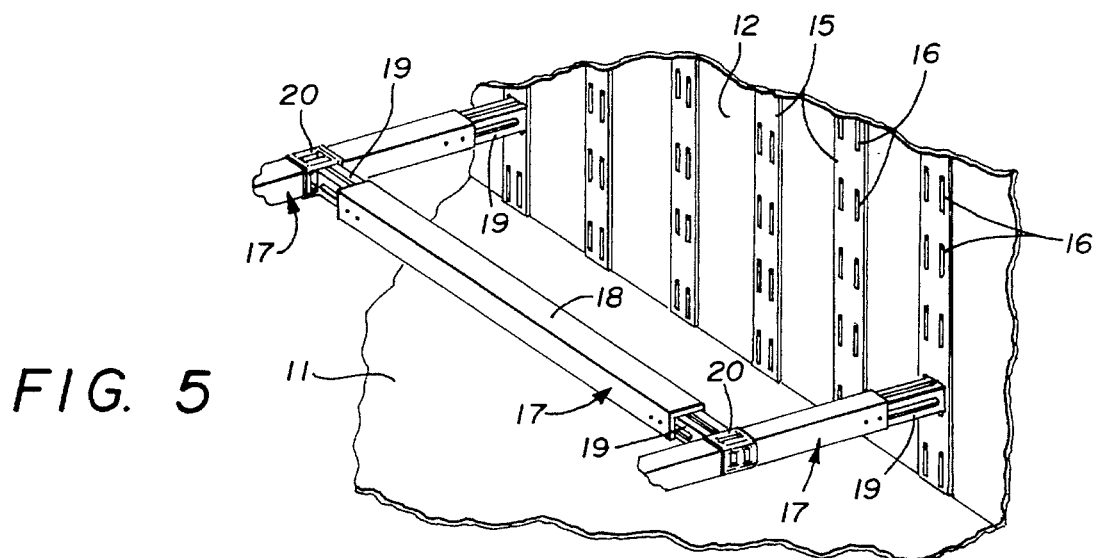
FIG. 5 is a fragmentary perspective view of an inner portion of the cargo area shown in FIG. 4 with the present invention used interconnecting multiple cargo beams.

Referring to FIGS. 4 and 5 of the drawings, an inner portion 10 of a cargo transport trailer can be seen having a trailer floor 11, upstanding inner sidewalls 12 and 13 and an end wall portion 14. A plurality of vertically positioned E-tracks 15 are secured within the hereinbefore described walls 12 and 13 chosen for illustration. Each vertical E-track 15 has a number of longitudinally spaced anchor slots 16 within defining multiple anchoring points along its surface from which are removably secured cargo beams 17. Referring to FIGS. 1, 5, and 7 of the drawings, each cargo beam 17 has a main tubular body member 18 with telescopically extensible fastening extension 19 extending from its ends. A locking tab 19A extends from said extension 19 and is engageable within respective oppositely disposed anchor slots 16. The cargo beam 17's main tubular body member is generally rectangular in cross-section with the fastening extensions of a selected size and shape to fit within. The cargo beam 17 is so positioned across the inner portion 10 of the cargo transport trailer 11 that it effectively divides the area and provides the area with additional cargo securing support points.

Figure 2:
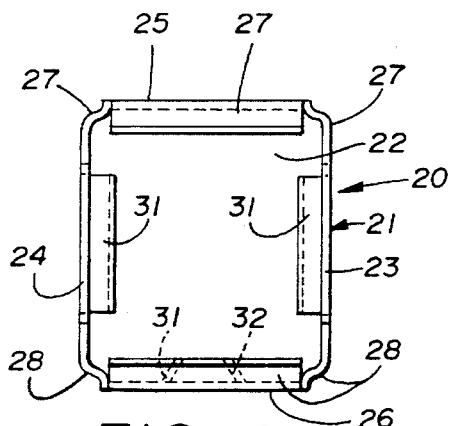
FIG. 2 is a front plan view of the present invention.
Figure 3:
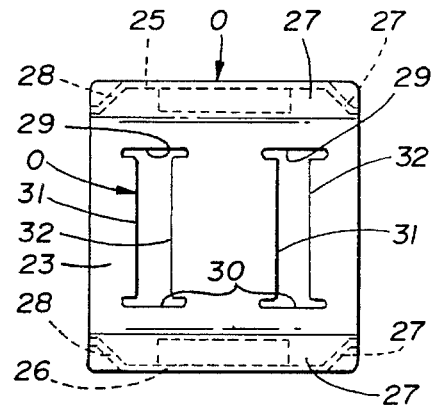
FIG. 3 is a side plan view of the present invention.

Referring now to FIGS. 1-3 of the drawings, a load anchor 20 of the present invention can be seen that is arranged for mounting on the cargo beam 17 for anchoring cargo and other cargo beams thereto. The load anchor 20 comprises an open ended tubular body member 21 which defines an inner opening 22 therethrough of a size and shape so as to fit slideably over the main tubular body member 18 of the cargo beam 17.

The load anchor 20 has a plurality of keyed openings O within each of its oppositely disposed sidewalls 23 and 24 and a single keyed opening in each of its respective top and bottom walls 25 and 26.

The sidewalls and top and bottom walls have respective oppositely disposed contoured offset edges 27 and 28, best seen in FIGS. 1 and 2 of the drawings. Each of the keyed openings O comprises oppositely disposed spaced aligned slots 29 and 30 with elongated inwardly curving spaced parallel flanges 31 and 32 extending therebetween defining a generally I-shaped opening therein as will be well known to those skilled in the art the respective edges 27, and 28 of the top and bottom walls 25 and 26 are horizontal planar alignment with said respective flanges 31 and 32 of the top and bottom walls.

FIG. 1 represents a deployed load anchor 20 on a portion of the cargo beam 17 wherein sliding engagement is achieved thereon with the load anchor points of cargo beam engagement being the multiple flanges 31 and 32 and the respective contoured offset edges 27 and 28 of the top and bottom walls 25 and 26.

Referring now to FIGS. 1–4 of the drawings, a cargo strap 33 can be seen having a slot engagement clip 34 positioned on the free ends thereof. The slot engagement clip 34 has a main body member 35 with slot engagement notches 36 and 37 and a spring urged retainer 38 within. A connection buckle 39 on the strap 33 provides means for adjustably tightening or for shortening the strap 33 between its attachment points as hereinbefore described as will be well known to those skilled in the art.

Referring to FIG. 4 of the drawings, in operation one cargo securing configuration utilizing a cargo beam 17 can be seen spaced in relation to the end wall 14 with a cargo strap 33 secured around a load 40 from the E-track 15 and the sidewall 13 to the load anchor 20 on the cargo beam 17. The strap is tightened thereabout by the connection buckle 39.

An alternate cargo beam positioning configuration is possible with use of the cargo anchor 20 of the invention as seen in FIG. 5 of the drawings wherein three cargo beams are secured to one another by engagement with respective load anchors 20 defining multiple clip engagement points at their respective key openings O.

Figure 6:
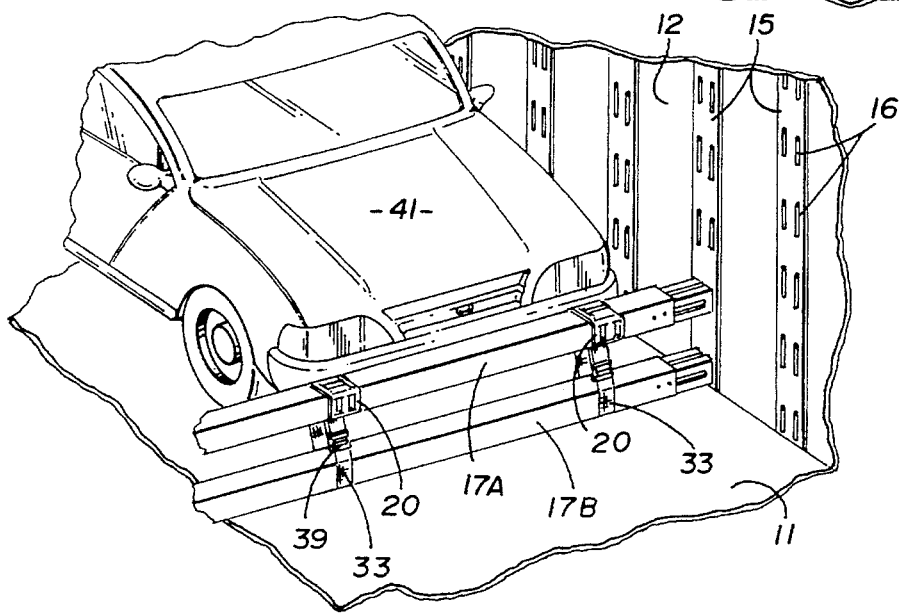
FIG. 6 is a fragmentary perspective view of a portion of the cargo area showing an alternate cargo beam cargo securing arrangement.

A third alternate cargo beam and strap configuration is illustrated in FIG. 6 of the drawings wherein an irregular load such as an automobile 41 is secured. In this illustration a pair of cargo beams 17A and B are positioned transversely across the inner portion of the cargo trailer in vertically spaced relation to one another with the lowermost cargo beam 17B installed upside down within the wall E-tracks 15. Two load anchors 20 of the invention are positioned in spaced longitudinal relation to one another on the uppermost cargo beam 17A with cargo straps 33 secured to the keyed openings O in the bottom wall 26 of said load anchor and extending around the lowermost cargo beam 17B returning upwardly to attachment with the automobile 41. Again, connection buckles 39 interconnect the portions of the straps 33 extending between the respective load anchors and automobile from the respective attachment points to provide tension adjustment to secure the automobile 41 in place by the downward force and parted by the connecting strap 33 portions.

It will be apparent from the above description that a variety of different cargo beam and strap configuration arrangements can be achieved by use of the load anchor 20 of the invention which is fully adjustable along the length of the cargo beam 17 on which it is positioned.

The load anchor 20 is held in place on the cargo beam 17 by the relative force imparted by the cargo straps 33 thereon as hereinbefore described.

It will thus be seen that a new and useful cargo securing load anchor device has been illustrated and described and it will be apparent to those skilled in the art that various changes and modifications may be made therein.

Therefore I claim:

1. A cargo load anchor for use on a cargo beam, said cargo load anchor comprises an open-ended tubular body member, said tubular body member comprises opposing sidewalls, a top and a bottom wall, a keyed opening in each of said sidewalls and said top and bottom walls, each of said keyed openings comprises a pair of spaced elongated slots, having integral inturned flanges extending from said respective walls interconnecting said slots, said sidewalls having contoured edges, a portion of said contoured edges engaging said top and bottom walls respectively, said top and bottom walls having oppositely disposed contoured perimeter edges.

2. The cargo load anchor device of claim 1 wherein said inturned flanges of said respective keyed openings are engageable on said cargo beam.

3. The cargo load anchor device of claim 1 wherein said contoured edges of said top and bottom walls are in horizontal planar alignment with said flanges of said respective keyed openings in said top and bottom walls.

4. The cargo load anchor device of claim 1 wherein said cargo beam is of a known cross-sectional dimension and said open ended tubular body member of the invention is of a cross-sectionally internal dimension greater than that of said cargo beam's known dimension.

5. The Cargo load anchor device of claim 3 wherein said contoured edges of said top and bottom walls are in angular offset relation from the horizontal plane of said respective top and bottom walls.

* * * * *